United States Patent [19]
Tomioka et al.

[11] Patent Number: 5,466,732
[45] Date of Patent: Nov. 14, 1995

[54] POLYIMIDE PRECURSOR SOLUTION, PROCESS FOR PRODUCING THE SOLUTION AND MOLDINGS AND COATINGS OBTAINED THEREFROM

[75] Inventors: Isao Tomioka, Kyoto; Takeshi Nakano, Ibaraki; Mikio Furukawa; Yoshiaki Echigo, both of Kyoto, all of Japan

[73] Assignee: Unitika Ltd., Hyogo, Japan

[21] Appl. No.: 217,767

[22] Filed: Mar. 25, 1994

Related U.S. Application Data

[63] Continuation of Ser. No. 935,962, Aug. 27, 1992, abandoned.

[30] Foreign Application Priority Data

| Aug. 28, 1991 | [JP] | Japan | 3-244646 |
| Sep. 30, 1991 | [JP] | Japan | 3-280862 |
| Sep. 30, 1991 | [JP] | Japan | 3-280863 |
| Oct. 25, 1991 | [JP] | Japan | 3-306706 |
| Jan. 22, 1992 | [JP] | Japan | 4-032657 |
| Jan. 24, 1992 | [JP] | Japan | 4-034524 |
| Jan. 24, 1992 | [JP] | Japan | 4-034525 |
| Apr. 23, 1992 | [JP] | Japan | 4-131842 |
| Jul. 2, 1992 | [JP] | Japan | 4-200626 |

[51] Int. Cl.$^6$ ............................. C08J 3/11; C08K 5/15
[52] U.S. Cl. ............. 524/113; 524/323; 524/324; 524/379; 524/606; 356/378
[58] Field of Search .................. 524/323, 324, 524/514, 606, 356, 361, 362, 363, 364, 366, 370, 113, 379, 378

[56] References Cited

U.S. PATENT DOCUMENTS

| 4,290,936 | 9/1981 | Sasaki et al. | 260/33.4 P |
| 4,535,115 | 8/1985 | Bakshi et al. | 524/376 |
| 4,546,115 | 10/1985 | Gagiliani et al. | 521/77 |
| 4,568,715 | 2/1986 | Itatani et al. | 524/348 |
| 4,720,539 | 1/1988 | Rabilloud et al. | 528/353 |
| 4,923,954 | 5/1990 | Klobucar et al. | 528/183 |

FOREIGN PATENT DOCUMENTS 1218361  1/1971  United Kingdom.

OTHER PUBLICATIONS

Patent Abstracts of Japan, Abstract of JP-A-61-241357.

*Primary Examiner*—Paul R. Michl
*Assistant Examiner*—U. K. Rajguru
*Attorney, Agent, or Firm*—Sughrue, Mion, Zinn, Macpeak & Seas

[57] ABSTRACT

A polyimide precursor solution which comprises a polyimide precursor and a solvent wherein the polyimide precursor and the solvent are not solvated strongly. A process for the production of the polyimide precursor solution, as well as moldings and coatings obtained from the solution.

The polyimide precursor solution of the present invention has excellent storage stability, and the solvent can be removed easily at the time of the production of moldings or coatings. According to the process of the present invention, the polyimide precursor solution can be produced easily using simple apparatus and an inexpensive solvent(s) having low toxicity. The polyimide molding obtained from the polyimide precursor solution has excellent uniformity and no residual solvent. The polyimide coating obtained from the polyimide precursor solution has excellent uniformity, no residual solvent and excellent adhesiveness to a base material.

40 Claims, No Drawings

POLYIMIDE PRECURSOR SOLUTION, PROCESS FOR PRODUCING THE SOLUTION AND MOLDINGS AND COATINGS OBTAINED THEREFROM

This is a continuation of application Ser. No. 07/935,962 filed on Aug. 27, 1992, now abandoned.

FIELD OF THE INVENTION

This invention relates to a solution of a polyimide precursor, to a process for the production of the solution and to polyimide moldings or polyimide coatings obtained from the solution.

BACKGROUND OF THE INVENTION

Solvents capable of dissolving poly(amic-acid)s as typical polyimide precursors are disclosed in *Journal of Polymer Science, Macromolecular Reviews*, vol.11, 1976 (Table 2 on page 164). In this table, N,N-dimethylformamide (DMF), N-methyl-2-pyrrolidone (NMP), hexamethylphosphoramide (HMPA), N-methylcaprolactam, dimethyl sulfoxide (DMSO), N-acetyl-2-pyrrolidone, N,N-dimethylacetamide (DMAc) and the like are listed as illustrative examples of such type of solvents. They are generally called "aprotic polar solvents" and have a high polarity with a dipole moment of about 3.0 debyes or more. For example, the just described typical poly(amic-acid) solvents DMAc, NMP, DMSO and DMF respectively have dipole moments of 3.7, 4.1, 4.3 and 3.9 debyes. The above-cited reference discloses that these solvents can be used not only as solvents for dissolving poly(amic-acid)s but also as polymerization solvents when a poly(amic-acid) is produced by polymerizing a diamine with a tetracarboxylic dianhydride.

In addition, the above-cited reference also discloses that a polyimide film can be obtained by dissolving a poly(amic-acid) in such an aprotic polar solvent and then distilling off the solvent from the solution to effect imidation and that a polyimide coating can be obtained by applying such a solution on a base material and then distilling off the solvent from the coated solution to effect imidation.

U.S. Pat. No. 4,238,528 discloses polyimide precursor solutions which comprise combinations of polyimide precursors, solvents [for example, NMP/acetone, NMP/cellosolve, NMP/xylene, NMP/toluene and (2-ethoxyethanol)-cellosolve/acetone] and nonionic fluorocarbon surface active agents.

JP-B-3-4588 discloses a polyimide precursor solution which comprises an aprotic polar organic solvent (selected from DMAc, NMP, DMSO and DMF), a polyimide precursor, a halogenated aliphatic hydrocarbon, a specified organic solvent and an organic silane. (The term "JP-B" as used herein means an "examined Japanese patent publication")

In addition, *IBM Technical Disclosure Bulletin* (vol.20, No.6, p.2041, November, 1977) discloses a polyimide precursor solution which is formed by mixing pyromellitic dianhydride/DMSO with diaminodiphenyl ether/NMP.

However, each of these aprotic polar solvents usually used as solvents of polyimide precursors, such as DMAc, NMP, DMSO, DMF and the like, strongly associates with a polyimide precursor which is the solute in the resulting solution because of the high dipole moment of the solvent. Such a phenomenon has been reported, for instance, in *Journal of Polymer Science* (A-1, vol.4, pp.2607–2616, 1966), *Journal of Polymer Science* (A, vol.25, pp.2005–2020, 1987), *Journal of Polymer Science* (A, vol.25, pp.2479–2491, 1987), *Kogyo Kagaku Zasshi* (vol.71, No.9, pp.1559–1564, 1968) and ANTEC '91 Abstract (pp.1742–1745). Because of the strong solvent/solute solvation, these prior art solvents cause various problems when polyimide films, polyimide coatings and the like are produced. In addition, since each of these solvents has a high dipole moment as has been disclosed in JP-B-3-4588, they have a high surface tension and show high viscosity levels which also cause various problems.

Thus, when a polyimide precursor is dissolved in a prior art aprotic polar solvent such as DMAc, NMP, DMSO, DMF or the like, the resulting solution shows a poor storage stability, and working conditions cannot be kept constant at the time of the production of moldings or coatings from the solution, in addition to difficulty in removing the solvent from the solution when moldings or coatings are produced. In the prior art process, a polyimide precursor solution is produced by a so-called "low temperature solution polymerization" in which a diamine (such as diaminodiphenyl ether) is allowed to undergo a polymerization reaction with a tetracarboxylic dianhydride such as pyromellitic dianhydride in an aprotic polar solvent. It has been believed that a polymerization solvent to be used in such a case must be a water-free good solvent which can dissolve monomers in a high concentration. Since hydrolysis of the acid anhydride progresses when water coexists in the aprotic polar solvent, it is necessary to carry out the polymerization reaction in a strictly water-free system which requires complex chemical reactors. In addition to the above, there are many other problems with regard to the prior art polar solvents such as: high production cost due to cost of the solvents; insufficient electric properties of the produced moldings or coatings because of the high amount of residual solvent; and insufficient uniformity of coatings or insufficient adhesiveness of coatings to a base material when a film or a coating is produced. Also, the solvent remaining in a molding is decomposed when the temperature of the molding is increased at the time of its use, thus entailing the generation of toxic carbon monoxide.

SUMMARY OF THE INVENTION

In view of the above, it therefore becomes an object of the present invention to provide a polyimide precursor solution which has excellent storage stability and from which the solvent can be removed easily at the time of the production of moldings or coatings.

Another object of the present invention is to provide a process for the production of a polyimide precursor solution, by which the polyimide precursor solution can be produced easily using a simple apparatus and a cheap solvent having low toxicity.

Still another object of the present invention is to provide a uniform polyimide molding containing substantially no residual solvent.

A further object of the present invention is to provide a uniform polyimide coating having no residual solvent and excellent adhesiveness to a base material.

With the aim of overcoming the aforementioned problems involved in the prior art, the inventors of the present invention conducted intensive studies and found that a solution of highly polymerized polyimide precursor can be produced easily and at a low cost even in the presence of water, by the use of a solvent or a mixed solvent which is not necessarily capable of dissolving monomers in a high concentration but which has a specific chemical characteristic and which does not show strong solvation with the formed polyimide precursor, and that polyimide moldings such as threads and films, as well as coatings, having excellent properties can be obtained from such a solution. The present invention was reached on the basis of these findings.

The gist of the present invention resides in:

(1) a polyimide precursor solution which comprises a polyimide precursor and a solvent in which the polyimide precursor and the solvent are not strongly solvated;

(2) a process for the production of a polyimide precursor solution which comprises allowing a tetracarboxylic dianhydride to undergo a polymerization reaction with a diamine in a solvent that does not solvate strongly with the polyimide precursor;

(3) a polyimide molding which is obtained by converting a polyimide precursor into the corresponding polyimide by ring closure and which contains substantially no residual solvent;

(4) a polyimide molding which is obtained by converting a polyimide precursor into the corresponding polyimide by ring closure and which contains substantially no aprotic polar organic solvent; and (5) a polyimide coating obtained by forming a coating on a base material, where the coating contains substantially no aprotic polar organic solvent and is obtained by converting a polyimide precursor into the corresponding polyimide by ring closure.

DETAILED DESCRIPTION OF THE INVENTION

Technical terms used in the present invention are now discussed.

(1) Polyimide

The term "polyimide" means an organic polymer having a property of no thermal melting but having thermal stability wherein 60 to 100 mol %, preferably 70 mol % or more, more preferably 80 mol % or more, of the repeating units of the polymer chain thereof has the polyimide structure as represented, for example, by the following formula (2):

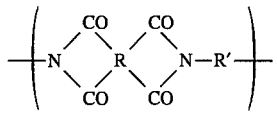

(2)

wherein R and R' are defined below.

(2) Polyimide precursor

The term "polyimide precursor" means an organic polymer which becomes a polyimide by ring closure effected by heating or a chemical reaction. Mixtures of two or more polyimide precursors also may be employed. In this instance, the term "ring closure" means formation of an imide ring. structure.

(3) Solvation

The term "strong solvation" means strong association of a solute and a solvent, or a substantial interaction between the solvent and a polyimide precursor as the solute in a polyimide precursor solution.

(4) Solvation index

The degree of solvation can be estimated, for example, on the basis of a solvation index measured by the following procedure: a 5,000 mg portion of a solution containing 300 mg of a polyimide precursor is poured uniformly in a conventional glass dish having an inner diameter of 86 mm and a height of 18 mm and air-dried at 20° C., until the content does not flow when the glass dish is slanted at an angle of 40 degree; thereafter, the solvent is removed by distillation at 40° C. for 40 hours under a reduced pressure of 10 mmHg and the weight of the polyimide precursor remaining in the dish is measured; and the solvation index is then calculated using the following formula:

$$\frac{A - 300}{300}$$

where A is weight (mg) of thus dried polyimide precursor.

(5) Poor solvent

The term "poor solvent" means a solvent which dissolves a polyimide precursor in an amount of 1 g/100 ml or less at 25° C.

The polyimide precursor solution of the present invention comprises a solvent and a polyimide precursor which, as described in the foregoing, is an organic polymer that becomes the corresponding polyimide by ring closure when heated or chemically treated.

Any type of organic polymer may be used, provided that it becomes a polyimide having a property of no thermal melting when subjected to ring closure. The ring closure may be effected by any conventionally used means such as a heat treatment or a process in which a cyclization agent such as pyridine and acetic anhydride is used as disclosed, for example, in *Macromolecular Reviews,* vol.11, pp.169–172 (1976).

Examples of preferred polyimide precursors include aromatic polyimide precursors which provide, when imidated, polyimides wherein a benzene ring of aromatic compounds is directly bonded to the imide group. Especially preferred examples of such polyimide precursors include poly(amic-acid)s having a repeating unit represented by the following general formula (1), which are either homopolymers or copolymers of two or more of the repeating units:

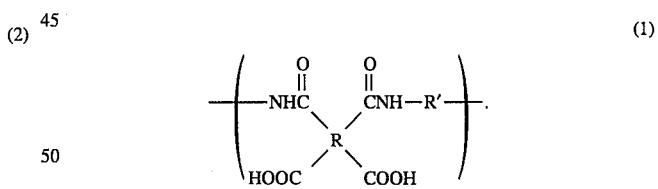

(1)

In the above formula, R is a tetravalent aromatic radical having 1 to 5 benzenoid-unsaturated rings of 6 carbon atoms, the four carbonyl groups being directly bonded to different carbon atoms in a benzene ring of the R radical and each pair of carbonyl groups being bonded to adjacent carbon atoms in the benzene ring of the R radical. The followings are illustrative examples of R:

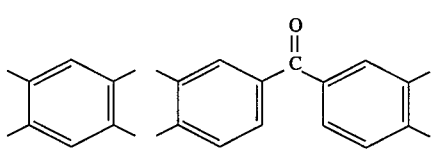

-continued

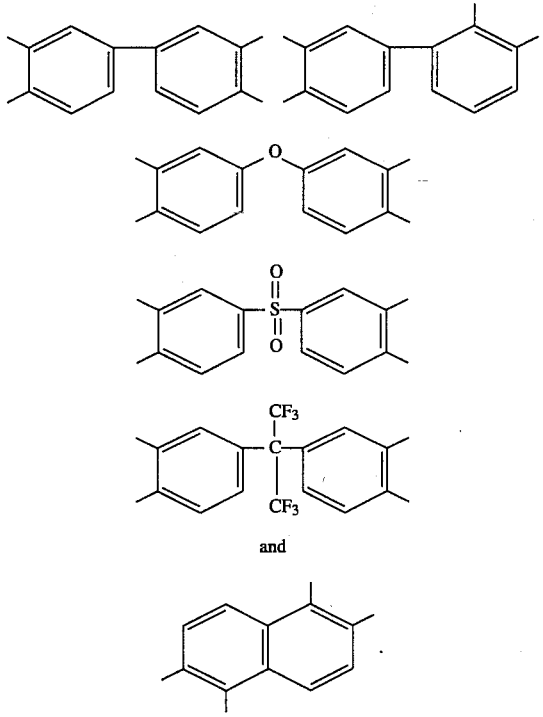

The followings are preferred examples of R:

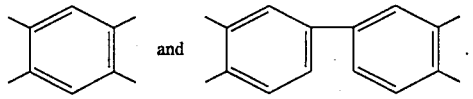

In the above general formula (1), R' is a divalent aromatic radical having 1 to 5 benzenoid-unsaturated rings of carbon atoms, the two amino groups being directly bonded to different carbon atoms in the benzene ring of the R' radical. The followings are illustrative examples of R':

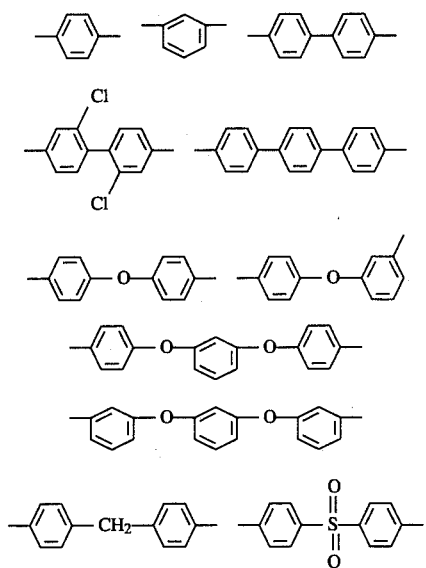

-continued

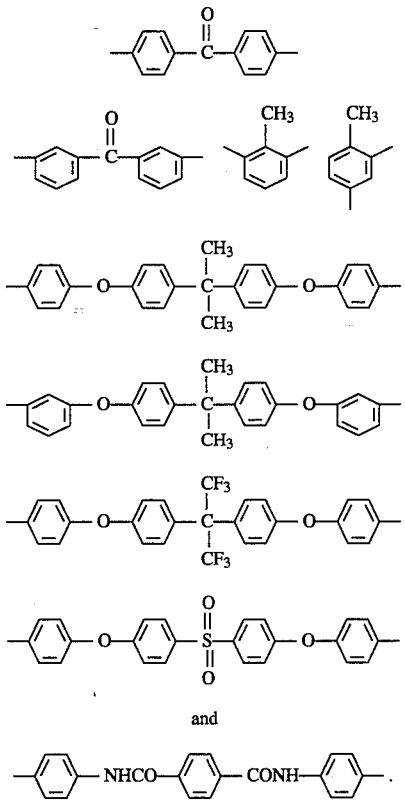

The following is a preferred example of R':

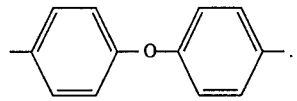

Most preferred examples of the poly(amic-acid) having the repeating unit represented by aforementioned general formula (1) are those obtained from pyromellitic dianhydride (PMDA) and diaminodiphenyl ether (DADE) and 3,3'-4,4'-biphenyltetracarboxylic dianhydride (BPDA) and DADE. When subjected to ring closure, the former becomes poly(4,4'-oxydiphenylenepyromellitimide) and the latter becomes poly(4,4,'-oxydiphenylene-3,3'-4,4'-biphenyltetracarboxy imide).

The polyimide precursor in the present invention may be a copolymer which further contains 40 mol % or less, preferably 30 mol % or less, more preferably 20 mol % or less, based on the total weight of the copolymer, of other units such as amide, ether and ester.

The polyimide precursor in the present invention preferably has an intrinsic viscosity ($\eta$) of at least 0.3, more preferably 0.7 or more, most preferably 1.0 or more. Though not particularly restricted, the upper limit of the intrinsic viscosity is preferably about 6. The intrinsic viscosity ($\eta$) is a value directly related to the molecular weight of a polymer and can be calculated using the following formula, after measuring the flow time of a polymer solution and of its solvent (DMAc) at 30° C. through a constant volume capillary tube of a standard viscometer.

$$\text{Intrinsic viscosity} = \frac{\ln \frac{\text{flow time of solution}}{\text{flow time of solvent}}}{c}$$

(wherein ln represents natural logarithm and c represents the gram-number of the polyimide precursor contained in 100 ml of the solution, i.e., 0.5)

The polyimide precursor used in the present invention may be partially imidated. In this case, the imidation percentage of the polyimide precursor is preferably 0 to 35 mol %. A polyimide precursor with more than 35 mol % imidation tends to decrease in its solubility. The partial imidation percentage can be calculated using the following formula, after measuring absorbances based on the infrared spectra of 604 cm$^{-1}$ and 882 cm$^{-1}$ of the polyimide precursor.

$$\text{Partial imidation percentage} = \frac{a}{a'} \times 100$$

In the above formula, a is the absorption ratio of a test sample and a' is the absorption ratio of a sample having 100% ring closure, as represented by the following formulae.

$$a = \frac{\text{absorbance (604 cm}^{-1}\text{)}}{\text{absorbance (882 cm}^{-1}\text{)}}$$

$$-a' = \frac{\text{absorbance (604 cm}^{-1}\text{)}}{\text{absorbance (882 cm}^{-1}\text{)}}$$

According to the present invention, the solvent used cannot show strong solvation with a polyimide precursor. A preferred solvation index in the solvent is less than 0.35, more preferably 0.1 to 0.3 (a solution wherein the solvation index is 3.5 or more should be considered as a "strongly solvated solution"). As the solvent which does not strongly solvate with a polyimide precursor, a solvent having a dipole moment of 3 debyes or less is preferably used. In general, one which is a poor solvent for the polyimide precursor when used as a single solvent but is a good solvent when used as a mixture with other poor solvents is preferably used.

Preferred examples of good solvents include mixed solvents selected from the group consisting of water soluble ether compounds, water soluble alcohol compounds, water soluble ketone compounds and water, or a water soluble compound having an ether group and an alcoholic hydroxyl group in the same molecule.

Illustrative examples of the water soluble ether compounds include tetrahydrofuran (THF), dioxane, trioxane, 1,2-dimethoxyethane, diethylene glycol dimethyl ether, diethylene glycol diethyl ether and the like, of which THF is particularly preferred.

Illustrative examples of the water soluble alcohol compounds include methanol, ethanol, 1-propanol, 2-propanol, tert-butyl alcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerol, 2-ethyl-2-hydroxymethyl-1,3-propanediol, 1,2,6-hexanetriol and the like, of which methanol, ethanol and ethylene glycol are particularly preferred.

Illustrative examples of the water soluble ketone compounds include acetone, methyl ethyl ketone and the like, of which acetone is particularly preferred.

Of the above compounds, THF, methanol, ethanol, ethylene glycol, acetone and water have a dipole moment of 1.70, 1.66, 1.68, 2.20, 2.69 and 1.94 debyes, respectively. That is, each of these preferred solvents has a dipole moment of less than 3.0 debyes and is a poor solvent for the polyimide precursor when used as a single solvent.

Preferred combinations of mixed solvents are a water soluble ether compound with water, a water soluble ether compound with a water soluble alcohol compound and a water soluble ketone compound with water. Preferred mixing ratio (weight ratio) in the mixed solvent are 96:4 to 79:21 in the case of a water soluble ether compound with water, 90:10 to 56:44 in the case of a water soluble ether compound with a water soluble alcohol compound and 90:10 to 40:60 in the case of a water soluble ketone compound with water.

Illustrative examples of the solvent having an ether group and an alcoholic hydroxyl group in the same molecule include 2-methoxyethanol, 2-ethoxyethanol, 2-(methoxymethoxy) ethoxyethanol, 2-isopropoxyethanol, 2-butoxyethanol, tetrahydrofurfuryl alcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy- 2-propanol, 1-ethoxy-2-propanol, dipropylene glycol, dipropylene glycol monomethyl ether, dipropylene glycol monoethyl ether, tripropylene glycol monomethyl ether, polyethylene glycol, polypropylene glycol and the like, of which 2-methoxyethanol and tetrahydrofurfuryl alcohol, having a dipole moment of 2.04 and 2.12 debyes, respectively, are particularly preferred. Such a type of solvent having an ether group and an alcoholic hydroxyl group in the same molecule can preferably be used alone, but it may also be used in combination with a poor solvent.

The preferred concentration of the polyimide precursor in the polyimide precursor solution of the present invention is in the range of from 0.1 to 60% by weight, more preferably from 1 to 25% by weight, most preferably from 5 to 20% by weight, based on the total weight of the solution.

In addition, when required, conventional additive agents may be added to the polyimide precursor solution of the present invention in such amounts that they do not harm the effect of the present invention. Examples of such additive agents include organic silanes, pigments, fillers such as conductive carbon black and metal particles, abrasive agents, dielectric substances, lubricants and the like. Other polymers and water insoluble solvents such as ethers, alcohols, ketones, esters, halogenated hydrocarbons, hydrocarbons and the like also may be used as additives in such amounts that they do not harm the effect of the present invention.

The polyimide precursor solution of the present invention can be obtained by allowing a tetracarboxylic dianhydride to undergo polymerization reaction with a diamine in a solvent which does not strongly solvate with a polyimide precursor. The following describes a process for the production of an aromatic poly(amic-acid) solution as a preferred example.

An aromatic tetracarboxylic dianhydride having the aforementioned R is allowed to undergo polymerization reaction with an aromatic diamine having the aforementioned R' in a solvent which does not strongly solvate with the aforementioned polyimide precursor. The reaction is preferably effected at a temperature of from −30° to +60° C., more preferably from −20° to +40° C., for a period of from 1 to 200 minutes, preferably from 5 to 100 minutes. A preferred monomer concentration is in the range of from 0.1 to 30% by weight, more preferably from 1 to 25% by weight, based on the total weight of the solution. Preferably, the polymerization reaction of a tetracarboxylic dianhydride with a diamine is carried out at a stoichiometric molar ratio, but the degree of polymerization may be controlled at will within the range of 0.95 to 1.05 by slightly changing mixing ratio of these monomers.

When polymerization is carried out, the monomers and the solvent may be added in any mixing order. When a mixed solvent system is used, each monomer is dissolved or suspended in each solvent, and the resulting solutions or suspensions are mixed and stirred at a predetermined temperature for a predetermined period of time to effect the polymerization reaction and thereby to obtain a poly(amic-acid) solution of the aforementioned concentration. In this instance, mixing of the monomer solutions or suspensions is preferably carried out by gradually adding one of the solutions or suspensions dropwise to the other. Alternatively, one of the monomers may be added gradually as a solid to the other monomer which has been dissolved or suspended in a solvent. In this way, a polyimide precursor solution having an intrinsic viscosity (4) of 0.3 or more is obtained.

Conversion of a polyimide precursor solution into a partially imidated polyimide precursor solution can be effected by heating the polyimide precursor solution at a temperature of from 60° to 100° C. for a period of from 1 to 200 minutes without allowing the solvent to distill off in an atomosphere of air.

A polyimide molding (a molded product) may be obtained by molding a polyimide precursor solution with its solvent removed and effecting chemical or thermal ring closure of the precursor. The term "a molding" as used herein means any type of molded products including what one might consider one-dimensional moldings such as threads and the like, two-dimensional moldings such as films, sheets, paper-like materials and the like (thickness, 1 to 100 µm), three-dimensional moldings such as circular cylinders, cuboids, cubes and the like, and various other complex-shaped products. Chemical imidation of a polyimide precursor molding by ring closure may be effected by soaking the polyimide precursor molding for 1 to 20 hours at 10° to 40° C. in a solution of a conventional imidation catalyst system such as pyridine and acetic anhydride, picoline and acetic anhydride, 2,6-lutidine and acetic anhydride or the like. Thermal imidation may be effected by heating the polyimide precursor molding at a temperature of from 150° to 300° C. for a period of from 0.5 to 5 hours in an atomosphere of inert gas such as nitrogen and argon under a pressure of 1 to 800 mmHg.

When a thread is produced as the molding, a polyimide precursor thread is firstly obtained by subjecting a polyimide precursor solution to wet spinning. Thereafter, the precursor thread is subjected to drawing and then to chemical or thermal imidation. With regard to the coagulation bath for use in wet spinning, any solvent may be used provided that it is a poor solvent for the polyimide precursor. In general, however, water (which is a typical poor solvent for the polyimide precursor) or a mixed solvent containing water in an amount of 70 to 100 % by weight is used. Any water soluble solvent may be used in such a mixed solvent, but preferably a water soluble ether such as THF, a water soluble alcohol such as methanol, a water soluble ketone such as acetone, or the like is used.

When a film is molded from a polyimide precursor solution, the precursor solution is applied on the surface of a base material by extruding from a slit type nozzle or using a bar coater or the like, and the thus formed coating is separated from the base material to obtain a polyimide precursor film which is subsequently subjected to imidation.

When a polyimide coating is produced, a polyimide precursor solution is applied to the surface of a base material by conventional means shch as spin coating, spray coating, dipping or the like. After drying the thus applied solution at 60° to 100° C. at an atmospheric pressure to remove its solvent, imidation is effected in the same manner as the case of the imidation of moldings.

The polyimide precursor solution of the present invention and moldings and coatings obtained from the solution can be used in the production, for example, of a heat resistant insulating tape, a heat resistant adhesive tape, a high density magnetic recording base, a condenser, a film for FPC (flexible printed circuit) use and the like. Such materials are also useful for the production of: molding materials and moldings such as a sliding means in which a fluoride resin, graphite or the like is packed, a structural element reinforced with glass fiber, carbon fiber or the like, a bobbin for miniature coil use, a sleeve, a terminal insulating tube and the like; laminated materials such as an insulating spacer for power transistor use, a magnetic head spacer, a power relay spacer, a transformer spacer and the like; and enamel coating materials for use in insulation coating of electric wires and cables, a solar battery, a low temperature storage tank, a space heat insulator, an integrated circuit, a slot liner and the like. They are also useful for the production of an ultrafiltration membrane, a reverse permeation membrane, a gas separation membrane and the like, as well as heat resistant thread, woven fabric, non-woven fabric and the like.

The following examples are provided to further illustrate the present invention. It is to be understood, however, that the examples are for purpose of illustration only and are not intended as a definition of the limits of the invention. Unless otherwise indicated, all percentages are by weight based on the total composition at issue.

EXAMPLE 1

A 2.00 g portion of diaminodiphenyl ether was dissolved in the mixture solvent composed of 32 g of THF and 1.5 g of water by a mechanical mixing at 30° C., and the resulting solution was maintained at 30° C. When 2.19 g of pyromellitic dianhydride was added spending 10 to 30 seconds to the above solution and the system stirred for 1 hour, a uniform yellow solution was obtained. The intrinsic viscosity ($\eta$) of the polyimide precursor was found to be 2.5. The thus obtained polyimide precursor solution was stable, with no significant decrease in the ($\eta$) value even after 2 weeks of storage at 20° C.

EXAMPLE 2

The polymerization reaction of Example 1 was repeated except that 40 g of THF containing 14% by weight of methanol was used as the solvent for the diaminodiphenyl ether and the resulting solution was maintained at 20° C. to obtain a uniform yellow solution. The intrinsic viscosity ($\eta$) of the polyimide precursor was found to be 1.9. The thus obtained polyimide precursor solution was stable, with no significant decrease in the ($\eta$) value even after 2 weeks of storage at 20° C.

EXAMPLE 3

A 2.00 g portion of diaminodiphenyl ether was dissolved in a mixed solvent which consisted of 28 g of THF and 12 g of ethanol, and the resulting solution was maintained at 25° C. When 2.19 g of pyromellitic dianhydride was added spending 10 to 30 seconds to the above solution and the system stirred for 1 hour, a uniform yellow solution was obtained. The intrinsic viscosity ($\eta$) of the polyimide precursor was found to be 2.8. The thus obtained polyimide precursor solution was stable, with no significant decrease in the (η) value even after 2 weeks of storage at 20° C.

EXAMPLE 4

A 6.02 g portion of diaminodiphenyl ether was dissolved in a mixed solvent which consisted of 79 g of THF and 34 g of ethylene glycol, and the resulting solution was maintained at 25° C. When 6.59 g of pyromellitic dianhydride was added spending 10 to 30 seconds to the above solution and the system stirred for 1 hour, a uniform yellow solution was obtained. The intrinsic viscosity (η) of the polyimide precursor was found to be 0.88. The thus obtained polyimide precursor solution was stable, with no significant decrease in the (η) value even after 2 weeks of storage at 20° C.

EXAMPLE 5

A 2.00 g portion of diaminodiphenyl ether was dissolved in a mixed solvent which consisted of 28 g of THF and 12 g of diethylene glycol, and the resulting solution was maintained at 25° C. When 2.19 g of pyromellitic dianhydride was added spending 10 to 30 seconds to the above solution and the system stirred for 1 hour, a uniform yellow solution was obtained. The intrinsic viscosity (η) of the polyimide precursor was found to be 1.4. The thus obtained polyimide precursor solution was stable, with no significant decrease in the (η) value even after 2 weeks of storage at 20° C.

EXAMPLE 6

A 2.00 g portion of diaminodiphenyl ether was dissolved in a mixed solvent which consisted of 20 g of THF and 20 g of diethylene glycol, and the resulting solution was maintained at 25° C. When 2.19 g of pyromellitic dianhydride was added spending 10 to 30 seconds to the above solution and the system stirred for 1 hour, a uniform yellow solution was obtained. The intrinsic viscosity (η) of the polyimide precursor was found to be 0.99. The thus obtained polyimide precursor solution was stable, with no significant decrease in the (η) value even after 2 weeks of storage at 20° C.

EXAMPLE 7

A 2.00 g portion of diaminodiphenyl ether was dissolved in a mixed solvent which consisted of 20 g of THF and 20 g of triethylene glycol, and the resulting solution was maintained at 25° C. When 2.19 g of pyromellitic dianhydride was added spending 10 to 30 seconds to the above solution and the system stirred for 1 hour, a uniform yellow solution was obtained. The intrinsic viscosity (η) of the polyimide precursor was found to be 0.85. The thus obtained polyimide precursor solution was stable, with no significant decrease in the (η) value even after 2 weeks of storage at 20° C.

EXAMPLE 8

A 2.00 g portion of diaminodiphenyl ether was dissolved in a mixed solvent which consisted of 16 g of THF and 24 g of polyethylene glycol (weight average molecular weight, 400), and the resulting solution was maintained at 25° C. When 2.19 g of pyromellitic dianhydride was added spending 10 to 30 seconds to the above solution and the system stirred for 1 hour, a uniform yellow solution was obtained. The intrinsic viscosity (η) of the polyimide precursor was found to be 0.50. The thus obtained polyimide precursor solution was stable, with no significant decrease in the (η) value even after 2 weeks of storage at 20° C.

EXAMPLE 9

A 2.00 g portion of diaminodiphenyl ether was dissolved in a mixed solvent which consisted of 32 g of acetone and 8 g of water, and the resulting solution was maintained at 25° C. When 2.20 g of pyromellitic dianhydride was added spending 10 to 30 seconds to the above solution and the system stirred for 1 hour, a uniform yellow solution was obtained. The intrinsic viscosity (η) of the polyimide precursor was found to be 0.88. The thus obtained polyimide precursor solution was stable, with no significant decrease in the (η) value even after 2 weeks of storage at 20° C.

EXAMPLE 10

A 2.01 g portion of diaminodiphenyl ether was dissolved in 50 g of tetrahydrofurfuryl alcohol, and the resulting solution was maintained at 25° C. When 2.19 g of pyromellitic dianhydride was added spending 10 to 30 seconds to the above solution and the system stirred for 1 hour, a uniform yellow solution was obtained. The intrinsic viscosity (η) of the polyimide precursor was found to be 1.0. The thus obtained polyimide precursor solution was stable, with no significant decrease in the (η) value even after 2 weeks of storage at 20° C.

EXAMPLE 11

A 2.00 g portion of diaminodiphenyl ether was dissolved in 40 g of 2-methoxyethanol, and the resulting solution was maintained at 25° C. When 2.19 g of pyromellitic dianhydride was added spending 10 to 30 seconds to the above solution and the system stirred for 1 hour, a uniform yellow solution was obtained. The intrinsic viscosity (η) of the polyimide precursor was found to be 0.70. The thus obtained polyimide precursor solution was stable, with no significant decrease in the (η) value even after 2 weeks of storage at 20° C.

COMPARATIVE EXAMPLE 1

A 6.02 g portion of diaminodiphenyl ether was dissolved in 112 g of dehydrated DMAc, and the resulting solution was maintained at 30° C. When 6.59 g of pyromellitic dianhydride was added at a constant rate spending 5 minutes to the above solution and the system stirred for 1 hour with dry nitrogen lightly blown, a uniform yellow solution was obtained. The intrinsic viscosity (η) of the polyimide precursor was found to be 2.6.

COMPARATIVE EXAMPLE 2

A 4.03 g portion of diaminodiphenyl ether was dissolved in 83 g of dehydrated NMP, and the resulting solution was maintained at 25° C. When 4.41 g of pyromellitic dianhydride was added at a constant rate spending 5 minutes to the above solution and the system stirred for 1 hour with dry nitrogen lightly blown, a uniform yellow solution was obtained. The intrinsic viscosity (η) of the polyimide precursor was found to be 2.4.

EXAMPLE 12

A solution was prepared by dissolving 2.19 g of pyromellitic dianhydride in 35.6 g of THF, and the thus prepared solution and 5.8 g of methanol were separately added dropwise to 2.01 g of diaminodiphenyl ether at a constant rate spending 40 minutes, while keeping the temperature at 5° C. with constantly stirring. After completion of the dropwise addition, stirring of the resulting mixture was continued for another 1 hour to obtain a uniform yellow solution. The intrinsic viscosity ($\eta$) of the polyimide precursor was found to be 1.6. The thus obtained polyimide precursor solution was stable, with no significant decrease in the ($\eta$) value even after 2 weeks of storage at 20° C.

EXAMPLE 13

A 2.00 g portion of diaminodiphenyl ether was dissolved in 45 g of THF containing 4% by weight of water, and the resulting solution was added dropwise to 2.19 g of pyromellitic dianhydride at a constant rate spending 40 minutes while keeping the temperature at −20° C. After completion of the dropwise addition, stirring of the resulting mixture was continued for another 1 hour to obtain a uniform yellow solution. The intrinsic viscosity ($\eta$) of the polyimide precursor was found to be 1.5. The thus obtained polyimide precursor solution was stable, with no significant decrease in the ($\eta$) value even after 2 weeks of storage at 20° C.

EXAMPLE 14

The polymerization reaction of Example 13 was repeated except that diaminodiphenyl ether was dissolved in 51.5 g of THF containing 12% by weight of methanol and the resulting solution was maintained at 5° C. to obtain a uniform yellow solution. The intrinsic viscosity ($\eta$) of the polyimide precursor was found to be 1.2. The thus obtained polyimide precursor solution was stable, with no significant decrease in the ($\eta$) value even after 2 weeks of storage at 20° C.

EXAMPLE 15

A 2.00 g portion of diaminodiphenyl ether was dissolved in 47 g of THF containing 5% by weight of water, and the resulting solution was added dropwise to 2.96 g of biphenyltetracarboxylic dianhydride at a constant rate spending 40 minutes while the temperature was kept at 0° C. After completion of the dropwise addition, stirring of the resulting mixture was continued for another 1 hour to obtain a uniform yellow solution. The intrinsic viscosity ($\eta$) of the polyimide precursor was found to be 1.3. The thus obtained polyimide precursor solution was stable, with no significant decrease in the ($\eta$) value even after 2 weeks of storage at 20° C.

EXAMPLE 16

A 28 g portion of THF containing 10% by weight of water was added dropwise to 2.96 g of biphenyltetracarboxylic dianhydride and 2.00 g of diaminodiphenyl ether at a constant rate spending 40 minutes, while the temperature was kept at 0° C. After completion of the dropwise addition, stirring of the resulting mixture was continued for another 1 hour to obtain a uniform yellow solution. The intrinsic viscosity ($\eta$) of the polyimide precursor was found to be 1.5. The thus obtained polyimide precursor solution was stable, with no significant decrease in the ($\eta$) value even after 2 weeks of storage at 20° C.

EXAMPLE 17

The polyimide precursors in the polyimide precursor solutions obtained in Examples 1, 2, 3, 4 and 9 and Comparative Examples 1 and 2 were checked for their ($\eta$) values, weight average molecular weights (Mw) and solvation indexes, with the results being shown in Table 1. In this instance, the Mw was expressed as a polystyrene-based molecular weight by measuring it by GPC which was carried out by passing each sample through a column (GL-S300MDT-5, Hitachi Chemical Co., Ltd.) at a flow rate of 1 ml/min, using a THF-DMF equivalent volume mixture (containing 60 mM phosphoric acid and 30 mM lithium bromide) as an eluting solution, and a differential refractometer as a detector.

TABLE 1

(Relationship between solvent and solvation index)

| | Solvent | ($\eta$) | Mw | Solvation index |
|---|---|---|---|---|
| Example 1 | THF/$H_2O$ | 2.5 | 401,000 | 0.284 |
| Example 2 | THF/MeOH | 1.9 | 303,000 | 0.307 |
| Example 3 | THF/EtOH | 2.8 | 450,000 | 0.280 |
| Example 4 | THF/EG | 0.88 | 107,000 | 0.174 |
| Example 9 | acetone/$H_2O$ | 0.88 | 106,000 | 0.167 |
| Comp. Ex. 1 | DMAc | 2.6 | 420,000 | 0.446 |
| Comp. Ex. 2 | NMP | 2.4 | 380,000 | 0.664 |

As is evident from Table 1, the polyimide precursor solutions obtained in the Examples have smaller solvation indexes than those of precursor solutions obtained in the Comparative Examples.

EXAMPLE 18

Each of the polyimide precursor solutions obtained in Examples 2 and 13 and Comparative Examples 1 and 2 was mixed with 1% by weight of water and maintained at 5° C. for 300 hours to examine changes in the ($\eta$) value of the polyimide precursor, with the results being shown in Table 2.

TABLE 2

(Changes in ($\eta$) in polyamide precursor solution)

| | 0 hr | 100 hrs | 200 hrs | 300 hrs |
|---|---|---|---|---|
| Example 2 | 1.9 | 1.9 | 1.8 | 1.8 |
| Example 13 | 1.5 | 1.3 | 1.4 | 1.4 |
| Comp. Ex. 1 | 2.6 | 1.8 | 1.5 | 1.7 |
| Comp. Ex. 2 | 2.4 | 2.4 | 1.9 | 1.8 |

As is evident from Table 2, the polyimide precursors in the polyimide precursor solutions obtained in the examples of the present invention did not cause a decrease in the ($\eta$) value by hydrolysis, thus showing markedly high storage stability. The reason for such a high storage stability of the inventive precursor solution seems to be due to weak solute/solvent solvation.

EXAMPLE 19

A poly(amic-acid) solution consisting of 8.0% by weight of poly(amic-acid), 87.4% by weight of THF and 4.6% by weight of water was deposited evenly on a glass plate in a thickness of 800 μm by passing film applicator over glass plate at a rate of 40 mm/second using a film applicator (Automatic Film Applicator, Yasuda Seiki Co., Ltd.). After 60 minutes of air-drying at 20° C., the resulting film was peeled off from the glass plate and heated at 300° C. for 120 minutes in an atmosphere of nitrogen to effect thermal ring closure. The film obtained in this way was transparent with a deep yellow color and was highly uniform. It had a thickness of 32 μm and a tensile strength of 14.0 kg/mm$^2$ and showed no evidence of carbon monoxide generation even when heated at 350° C.

EXAMPLE 20

A poly(amic-acid) solution consisting of 8.0% by weight of poly(amic-acid), 73.6% by weight of THF and 18.4% by weight of methanol was poured evenly on a glass plate in a thickness of 800 μm at a rate of 40 mm/second using a film applicator. After 30 minutes of drying by air drying at 20° C., the resulting film was peeled off from the glass plate and heated at 300° C. for 120 minutes in an atmosphere of nitrogen to effect thermal ring closure. The film obtained in this way was transparent with a yellowish brown color and was highly uniform. It had a thickness of 29 μm and a tensile strength of 12.3 kg/mm² and showed no evidence of carbon monoxide generation even when heated at a high temperature.

EXAMPLE 21

A poly(amic-acid) solution consisting of 16.7% by weight of poly(amic-acid), 80.0% by weight of THF and 3.3% by weight of water was deposited evenly on a glass plate in a thickness of 250 μm at a rate of 25 mm/second using a film applicator. After 30 minutes of drying by air drying at 20° C., the resulting film was peeled off from the glass plate and soaked for 12 hours in an acetic anhydride/pyridine solution (70/30 by volume) to effect ring closure. After the treatment, the resulting film was washed with an excess amount of toluene at 20° C. to extract and remove the cyclization agent and then dried at 80° C. for 120 minutes. The film obtained in this way was transparent with a bright yellow color and was highly uniform. It had a thickness of 20 μm and a tensile strength of 14.6 kg/mm² and showed no evidence of carbon monoxide generation even when heated at a high temperature.

EXAMPLE 22

A poly(amic-acid) solution consisting of 8.0% by weight of poly(amic-acid), 73.6% by weight of THF and 18.4% by weight of methanol was subjected to spinning at a spinning rate of 10 m/min by delivering the solution through a nozzle (0.08 mmØ×20 holes) at a delivery rate of 1.5 ml/min into a coagulation bath containing water having a temperature of 20° C. The resulting thread was drawn to about 1.5 times its original length in water, wound up on a roll and air-dried for 60 minutes. After further drying at 80° C. for 120 minutes in air, the resulting thread was heated at 300° C. for 60 minutes in an atmosphere of nitrogen under a pressure of 1 mmHg to effect thermal ring closure. The thread obtained in this way was yellowish brown and had a modulus of elasticity of 73 g/d.

EXAMPLE 23

The spinning process of Example 22 was repeated except that the ring closure after air-drying was effected by soaking the thread for 12 hours in an acetic anhydride/pyridine solution (70/30 by volume). The thread obtained in this way was bright yellow and had a modulus of elasticity of 81 g/d.

EXAMPLE 24

A poly(amic-acid) solution consisting of 6.0% by weight of poly(amic-acid), 75.8% by weight of THF and 18.2% by weight of methanol was poured evenly on a surface-treated copper foil having a thickness of 25 μm in a thickness of 1,500 μm at a rate of 40 mm/second using a film applicator. After 30 minutes of drying by air drying at 20° C., the resulting foil was heated at 200° C. for 15 hours under a pressure of 1 mmHg oven to effect thermal ring closure. The coating obtained in this way was transparent with a deep yellow color and rigidly adhered to the surface of the copper foil. When the copper foil was removed by etching, the remaining coating had a thickness of 35 μm and a tensile strength of 15.9 kg/mm².

EXAMPLE 25

A poly(amic-acid) solution consisting of 6.0% by weight of poly(amic-acid), 90.2% by weight of THF and 3.8% by weight of water was poured evenly on a copper foil, which had not been surface-treated, having a thickness of 25 μm in a thickness of 600 μm at a rate of 40 mm/second using a film applicator. After 30 minutes of air blast drying at 20° C., the foil was heated at 300° C. for 120 minutes in an atmosphere of nitrogen under a pressure of 760 mmHg to effect thermal ring closure. The coating obtained in this way was transparent with a deep yellow color and rigidly adhered to the surface of the copper foil. When the copper foil was removed by etching, the remaining coating had a thickness of 17 μm and a tensile strength of 14.6 kg/mm².

Thus, it is apparent that there have been provided, in accordance with the present invention, a solution of a polyimide precursor, a process for the production of the solution and polyimide moldings or polyimide coatings obtained from the solution. The polyimide precursor solution of the present invention has excellent storage stability, and removal of its solvent at the time of the production of moldings or coatings is easily done. Also, according to the process of the present invention, a polyimide precursor solution can be produced easily using an inexpensive solvent having low toxicity by simple equipment. In addition, moldings and coatings prepared from the polyimide precursor solution of the present invention hardly contain residual solvent and are uniform, and the coating has markedly high adhesiveness to other base materials.

Although some preferred embodiments have been described, many modifications and variations may be made thereto in the light of the above teachings. It is to be understood that within the scope of the claims, the invention may be practiced otherwise than as specifically described.

What is claimed is:

1. A polyimide precursor solution which comprises a polyimide precursor and a solvent, wherein (1) said polyimide precursor does not dissolve in tetrahydrofuran, and has
   (a) a chemical structure represented by the repeating unit (1)

(1)

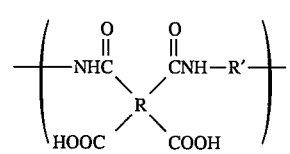

wherein R is a tetravalent aromatic radical having 1 to 5 benzenoid-unsaturated rings of 6 carbon atoms, the four carbonyl group being directly bonded to different carbon atoms in a benzene ring of the R radical and each pair of carbonyl groups is bonded to adjacent carbon atoms in the benzene ring of the R radical and wherein R' is a divalent aromatic radical having 1 to 5 benzenoid-unsaturated rings of 6 carbon atoms, the amino groups being directly bonded to different carbon atoms in a benzene ring of the R' radical, and (b) a solubility in tetrahydrofuran of 1 g/100 ml or less and (2) said solvent is selected from the group consisting of (a) a mixture of at least two different components selected from the group consisting of (i) at least one water soluble ether compound, (ii) at least one water soluble aliphatic alcohol compound, (iii) at least one water soluble ketone compound and (iv) water, and (b) a compound which has an ether group and an alcoholic hydroxyl group in the same molecule.

2. The polyimide precursor solution according to claim 1 wherein said polyimide precursor is used in an amount of from 1 to 25% by weight.

3. The polyimide precursor solution according to claim 1 wherein said polyimide precursor is an aromatic poly(amic-acid) prepared from an aromatic tetracarboxylic dianhydride and an aromatic diamine.

4. The polyimide precursor solution according to claim 1 wherein said polyimide precursor is a precursor of poly(4,4'-oxydiphenylenepyromellitimide).

5. The polyimide precursor solution according to claim 1 wherein said polyimide precursor is a precursor of poly(4,4'-oxydiphenylene-3,4,3'4'-biphenyltetracarboxy imide).

6. The polyimide precursor solution according to claim 1 wherein said solvent has a solvation index of less than 0.35.

7. The polyimide precursor solution according to claim 1 wherein each solvent as a composing element of said mixture (a) has a dipole moment of 3 debyes or less.

8. The polyimide precursor solution according to claim 1 wherein each solvent as a composing element of said mixture (a) is a poor solvent of said polyimide precursor.

9. The polyimide precursor solution according to claim 1 wherein said mixture (a) is composed of said water soluble ether compound and water.

10. The polyimide precursor solution according to claim 1 wherein said mixture (a) is composed of said water soluble ether compound and said water soluble aliphatic alcohol compound.

11. The polyimide precursor solution according to claim 1 wherein said mixture (a) is composed of said water soluble ketone compound and water.

12. The polyimide precursor solution according to claim 1 wherein said mixture (a) is composed of tetrahydrofuran and water.

13. The polyimide precursor solution according to claim 1 wherein said mixture (a) is composed of tetrahydrofuran and at least one water soluble aliphatic alcohol compound selected from the group consisting of methanol, ethanol and ethylene glycol.

14. The polyimide precursor solution according to claim 1 wherein said mixture (a) is composed of acetone and water.

15. The polyimide precursor solution according to claim 1 wherein said compound (b) is at least one member selected from the group consisting of methoxyethanol and tetrahydrofurfuryl alcohol.

16. A process for producing a polyimide precursor solution which comprises polymerizing a tetracarboxylic dianhydride with a diamine in a solvent selected from the group consisting of (a) a mixture of at least two different components selected from the group consisting of (i) at least one water soluble ether compound, (ii) at least one water soluble aliphatic alcohol compound, (iii) at least one water soluble ketone compound and (iv) water, and (b) a compound which has an ether group and an alcoholic hydroxyl group in the same molecule, wherein said polyimide precursor has (a) a chemical structure represented by the repeating unit (1)

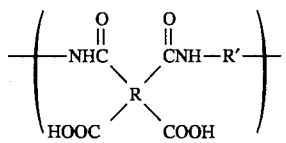

(1)

wherein R is a tetravalent aromatic radical having 1 to 5 benzenoid-unsaturated rings of 6 carbon atoms, the four carbonyl group being directly bonded to different carbon atoms in a benzene ring of the R radical and each pair of carbonyl groups is bonded to adjacent carbon atoms in the benzene ring of the R radical and wherein R' is a divalent aromatic radical having 1 to 5 benzenoid-unsaturated rings of 6 carbon atoms, the amino groups being directly bonded to different carbon atoms in a benzene ring of the R' radical, and (b) a solubility in tetrahydrofuran of 1 g/100 ml or less.

17. The process for producing a polyimide precursor solution according to claim 16 wherein said polyimide precursor is used in an amount of from 1 to 25% by weight.

18. The process for producing a polyimide precursor solution according to claim 16 wherein said tetracarboxylic dianhydride is an aromatic tetracarboxylic dianhydride and said diamine is an aromatic diamine.

19. The process for producing a polyimide precursor solution according to claim 16 wherein said tetracarboxylic dianhydride is pyromellitic dianhydride and said diamine is diaminodiphenyl ether.

20. The process for producing a polyimide precursor solution according to claim 16 wherein said tetracarboxylic dianhydride is 3,4,3',4'-biphenyltetracarboxylic dianhydride and said diamine is diaminodiphenyl ether.

21. The process for producing a polyimide precursor solution according to claim 16 wherein said solvent has a solvation index of less than 0.35.

22. The process for producing a polyimide precursor solution according to claim 16 wherein each solvent as a composing element of said mixture (a) has a dipole moment of 3 debyes or less.

23. The process for producing a polyimide precursor solution according to claim 16 wherein each solvent as a composing element of said mixture (a) is a poor solvent of said polyimide precursor.

24. The process for producing a polyimide precursor solution according to claim 16 wherein said mixture (a) is composed of said water soluble ether compound and water.

25. The process for producing a polyimide precursor solution according to claim 16 wherein said mixture (a) is composed of said water soluble ether compound and said water soluble aliphatic alcohol compound.

26. The process for producing a polyimide precursor solution according to claim 16 wherein said mixture (a) is composed of said water soluble ketone compound and water.

27. The process for producing a polyimide precursor solution according to claim 16 wherein said mixture (a) is composed of tetrahydrofuran and water.

28. The process for producing a polyimide precursor solution according to claim 16 wherein said mixture (a) is composed of tetrahydrofuran and at least one water soluble alcohol compound selected from the group consisting of methanol, ethanol and ethylene glycol.

29. The process for producing a polyimide precursor solution according to claim 16 wherein said mixture (a) is composed of acetone and water.

30. The process for producing a polyimide precursor solution according to claim 16 wherein said compound (b) is at least one compound selected from the group consisting of 2-methoxyethanol and tetrahydrofurfuryl alcohol.

31. A polyimide molding which is obtained by ring closure of a polyimide precursor and which contains substantially no aprotic polar organic solvent wherein said polyimide precursor has (a) a chemical structure represented by the repeating unit (1).

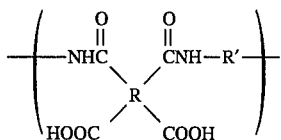

(1)

wherein R is a tetravalent aromatic radical having 1 to 5 benzenoid-unsaturated rings of 6 carbon atoms, the four carbonyl group being directly bonded to different carbon atoms in a benzene ring of the R radical and each pair of carbonyl groups is bonded to adjacent carbon atoms in the benzene ring of the R radical and wherein R' is a divalent aromatic radical having 1 to 5 benzenoid-unsaturated rings of 6 carbon atoms, the amino groups being directly bonded to different carbon atoms in a benzene ring of the R' radical, and (b) a solubility in tetrahydrofuran of 1 g/100 ml or less.

32. The polyimide molding according to claim 31 wherein said polyimide molding is a film.

33. The polyimide molding according to claim 31 wherein said polyimide molding is a thread.

34. The polyimide molding according to claim 31 wherein said polyimide precursor is an aromatic poly(amic-acid) which is composed of an aromatic tetracarboxylic dianhydride and an aromatic diamine.

35. The polyimide molding according to claim 31 wherein said polyimide precursor is a precursor of poly(4,4'-oxydiphenylenepyromellitimide).

36. The polyimide molding according to claim 31 wherein said polyimide precursor is a precursor of poly(4,4'-oxydiphenylene- 3,4,3',4'-biphenyltetracarboxy imide).

37. A polyimide coating which is obtained by forming a coating on a base material, wherein said coating is prepared by ring closure of a polyimide precursor and contains substantially no aprotic polar organic solvent.

38. The polyimide coating according to claim 37 wherein said polyimide precursor is an aromatic poly(amic-acid) which is composed of an aromatic tetracarboxylic dianhydride and an aromatic diamine.

39. The polyimide coating according to claim 37 wherein said polyimide precursor is a precursor of poly(4,4'-oxydiphenylenepyromellitimide).

40. The polyimide coating according to claim 37 wherein said polyimide precursor is a precursor of poly(4,4'-oxydiphenylene- 3,4,3',4'-biphenyltetracarboxy imide).

* * * * *